(No Model.)

A. G. NEVILLE.
GLASS MELTING POT.

No. 409,368. Patented Aug. 20, 1889.

WITNESSES
Walter H. Pumphrey.
Van Buren Hillyard.

INVENTOR
Asa G. Neville
By R. S. & A. P. Lacey
Attorneys

UNITED STATES PATENT OFFICE.

ASA G. NEVILLE, OF LAZEARVILLE, WEST VIRGINIA.

GLASS-MELTING POT.

SPECIFICATION forming part of Letters Patent No. 409,368, dated August 20, 1889.

Application filed November 28, 1888. Serial No. 292,083. (No model.)

*To all whom it may concern:*

Be it known that I, ASA G. NEVILLE, a citizen of the United States, residing at Lazearville, in the county of Brooke and State of West Virginia, have invented certain new and useful Improvements in Glass-Melting Pots; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to glass-melting pots which are especially designed to be used in furnaces, and has for its object to produce a pot that will fill a long-felt want, and which can be used as a closed or open pot, as required, and in which the temperature of the mass or batch can be regulated by controlling the hot and the cold blast. The escape-flue will communicate with the pot at different levels to draw the flame down on the surface of the batch, and the hot blast will extend through the roof or crown of the pot at several places to insure its coming in contact with the entire surface of the batch.

The improvement consists of the novel features which will be hereinafter more fully described and claimed, and which are shown in the annexed drawings, in which—

Figure 1:
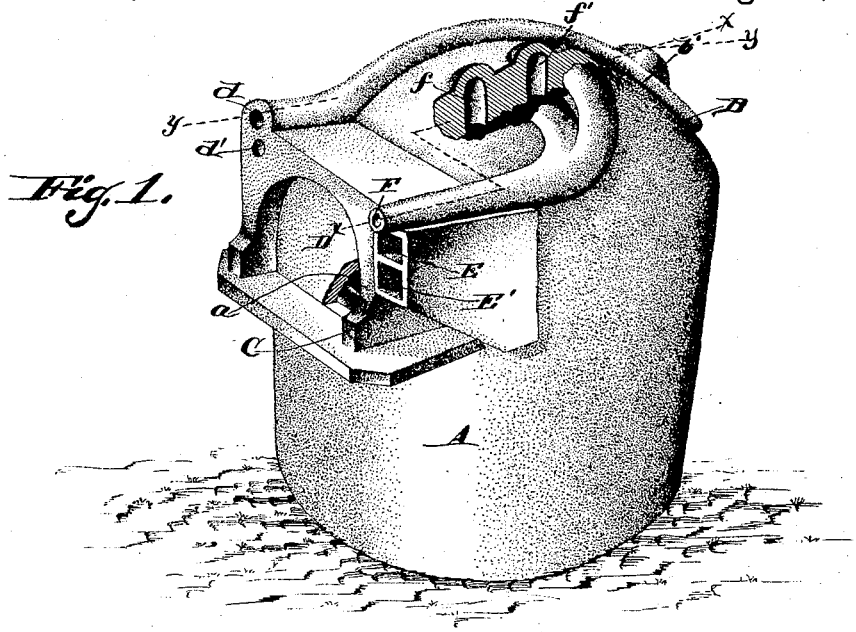
Figure 2:
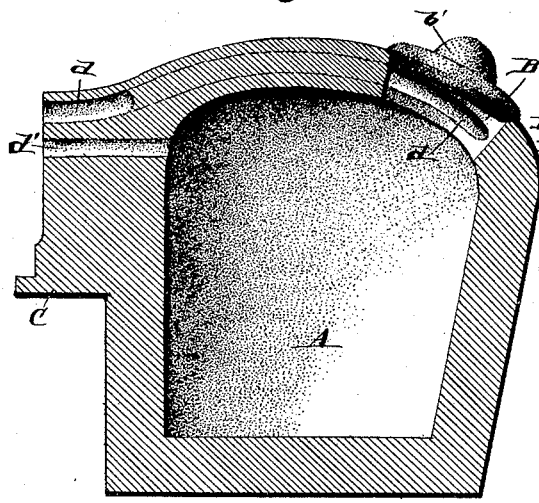
Figure 3:
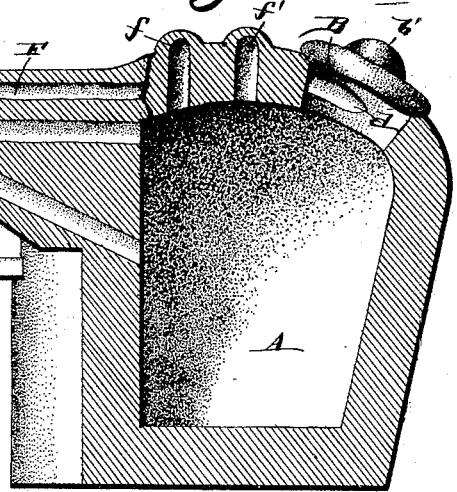

Figure 1 is a perspective view, parts being broken away, of a pot of my invention; Fig. 2, a section about on the line $x\,x$ of Fig. 1, looking to the left; and Fig. 3, a section about on the line $y\,y$ of Fig. 1.

The pot A is of convenient size and shape, and is provided with the glory-hole $a$ and with the opening B in its crown opposite the glory-hole $a$. The opening $b$, when desired, is closed when filled by the stopper $b'$. The glory-hole is surrounded by the hood C, and is closed by the stopper D. The air-passages $d$ and $d'$ communicate with the interior of the pot near the rear and the front thereof, and are designed to supply the air necessary for supporting combustion. The air-passage $d$ leads into the opening B, and the passage $d'$ terminates in the front side of the pot near the glory-hole. The escape-flues E and E' extend through the front side of the pot and communicate therewith at different points, the flue E terminating near the crown of the pot and the flue E' at some point below the end of the flue E. The hot-blast passage F branches near its inner end to form the two branches $f$ and $f'$, which extend through the roof of the pot and communicate with its interior at different points.

In using my pot it is built for a furnace in the usual manner. The material is placed in the pot through the glory-hole, which is closed by stopper D during the reduction of the said material to a molten or plastic condition. The flame enters the opening B and is drawn over and down upon the material in the pot by the draft through the flues E and E'. When the material is first placed in the pot, it is loose and nearly fills it, but when fused, or partially so, it is considerably reduced in bulk. In the first instance the draft is through flue E. In the latter instance it is through the flue E'. The process of fusion is accelerated by the blast through the passage F. The air for supporting the combustion or promoting the same is supplied through the passages $d$ and $d'$.

For my glass-melting pot I claim the following advantages:

First. It can be made nearly as cheap as a closed pot.

Second. The pots will last much longer, because they contract only one-half the heat in the back.

Third. They will make a superior quality of glass to that made in tanks, and equally as good glass as is made in the covered pots now in use, with a much cheaper bath and less soda, which is one of the costliest articles in the glass-making art.

Fourth. It melts in about one-third to one-half less time than the pots now in use.

Fifth. It can be used as an open or closed pot.

Sixth. It can be used in a furnace using for fuel natural gas, oil, or fuel-gas.

Seventh. There is nothing about it to get out of order, and it can be constructed by any pot-maker skilled in the art of making pots for glass-house purposes.

Having thus described my invention, what I claim, and desire to secure by Letters Patent, is—

The herein shown and described glass-melting pot, having a glory-hole, a flame-opening, an air-passage communicating with the flame-opening, and a hot-air-blast passage communicating with the crown of the pot at different points and having a series of escape-flues communicating with the pot at different levels and on the side thereof opposite the flame-opening, substantially as described.

In testimony whereof I affix my signature in presence of two witnesses.

ASA G. NEVILLE.

Witnesses:
OLIVER BRYER,
ISAAC M. JOHNSON.